United States Patent Office 2,772,185
Patented Nov. 27, 1956

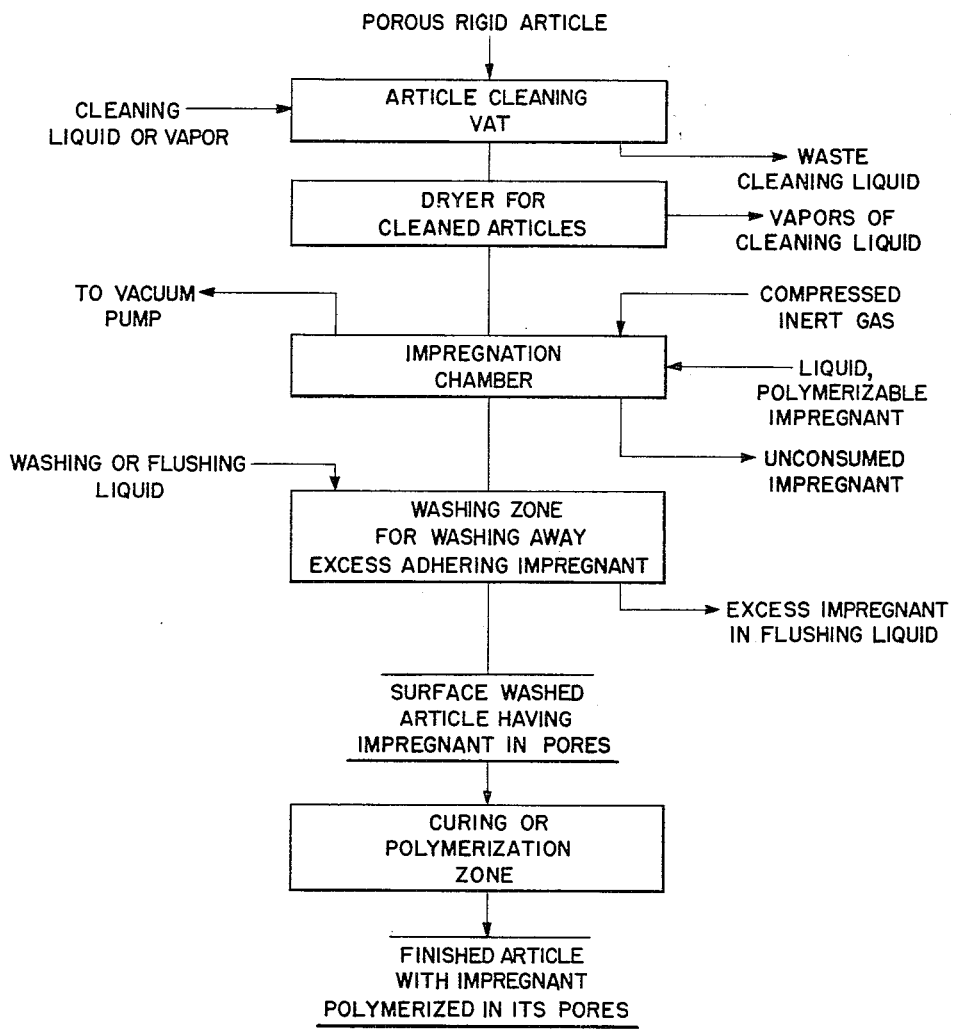

2,772,185

TREATING SOLID OBJECTS

Charles B. Dempster, New York, N. Y., assignor to American Metaseal Manufacturing Corporation, a corporation of New Jersey Application May 15, 1953, Serial No. 355,393

10 Claims. (Cl. 117—102)

*Fluid tight objects and their preparation*

This invention relates to the impregnation of solid objects, having either microscopic or macroscopic pores or both, by immersion in a liquid material comprising one or more substances ploymerizable to the solid state, and whereby all excess ploymerizable material on the surfaces of the object outside of the pores must be removed before the object is treated to cure the polymerizable material to its solid resinous state.

More particularly the invention covers the impregnation of such porous objects with a liquid, organic polymerizable impregnant that remains stably liquid at usual atmospheric temperatures and under superatmospheric pressure, thus requiring no refrigeration between successive impregnation cycles with it, and that yet can be cured readily to solid state under appropriate conditions. The invention also includes the impregnation of these porous objects with such liquid, organic polymerizable impregnant that is highly polar to metals, whereby it readily wets the pores of, for example, porous metal objects thereby effecting unusually thorough and even substantially complete penetration.

A very special feature of the invention is the impregnation of these porous objects with such liquid, organic polymerizable impregnant, the excess of which outside of the pores can be removed without using volatile and hazardous solvents. According to this feature, the excess polymerizable impregnant can simply be flushed, washed or surged away by water, aqueous solutions or other low volatile and safely handleable liquids in which the impregnant is emulsifiable. In addition, the invention includes the impregnation of copper-bearing materials such as brass and bronze objects, because the organic polymeriizable impregnants exhibiting the other features of the invention are stable to copper and polymerizable even in contact with it.

In another aspect, the invention covers the porous bodies, especially metal bodies, with their pores plugged with the liquid, organic polymerizable impregnant that remains stably liquid at usual atmospheric temperatures and even under at least moderate superatmospheric pressures to require no refrigeration between successive impregnation cycles with it, and the excess of which on the surfaces outside of the pores can be washed or flushed away because it is emulsifiable in low volatile and safely handleable liquids like water. The invention also includes these porous bodies with their pores plugged with these liquid, organic polymerizable impregnants cured to the solid resinous state within the pores.

While the invention, in its broadest aspect, is applicable to porous objects generally, inorganic, such as metallic or non-metallic, as well as organic, an important extensive use of it is in the impregnation of porous metal bodies. Therefore, the invention conveniently may be illustrated by describing it as used in impregnating metal objects such as castings, and with the resulting impregnated metal castings, although it is not restricted to that field.

Various types of organic impregnants have been used before this invention. For example, tung oil, the drying oil incorporated in paints, was used in impregnating magnesium castings and very effectively stopped leakage due to their microporosity. Tung oil itself is relatively viscous. To improve its penetration, its viscosity had to be lowered by thinners or solvents such as xylol or other benzene derivatives. These and xylol do not take part in the polymerization and then because of their volatility escape as vapor either before or during the curing treatment. The result was spongy impregnation with its own porosity left by the volatilized thinner.

Synthetic resins, for example, of the phenol formaldehyde type, were then tried on aluminum and stainless steel castings. However, they could be used only in solutions containing as high as fifty percent of solvents such as acetone and alcohol. These likewise do not participate in the polymerization and have to be vaporized off before or during the curing, thereby showing the same handicaps as caused by the thinners used with tung oil. Moreover, these were emphasized with the phenolic resins because, being of the so-called condensation type, they in addition liberated water vapor which also has to escape.

As neither drying oils nor synthetic resins were effective impregnants for both fine and coarse porosity, mixtures of drying oils and resins were then tried. Styrene monomer can copolymerize with linseed oil or with dehydrated castor oil to yield a rubber-like solid suitable to impregnate some castings against porosity. Unfortunately, since completion of the reaction requires large proportions of styrene, it in effect behaves like a solvent because a large part of it volatilizes off while the impregnant jells or sets.

It was found that sealability of solvent-containing impregnants depended on the percent of volatile material that escaped during the curing step, and those having high volatile content after impregnation left a higher residual leakage for a given pore size. This was blamed chiefly on the opening of channels and expulsion of solid matter by solvent vapors released during the curing step. These organic solids exuded to the surface from the pores of castings were extremely difficult to remove, left dirty and frequently still leaky castings and interfered with surface treatments like plating, anodization and others.

The advent of the polyesters and their co-polymerization with styrene gave thermosetting solids, with no evolution of water vapor or other volatiles, and considered to be one hundred percent solid as they have practically no volume loss during polymerization.

Yet they too presented several serious disadvantages. During standing at even ordinary room temperatures they showed a marked tendency to set prematurely even in the absence of polymerization catalysts. This required keeping them under refrigeration to reduce the rate of gelation, with obvious increase in cost and space requirements as well as curtailed production.

Then also, the viscosity of these mixtures of polyesters and styrene varied with temperature and significantly reduced their penetration into fine pores and micropores. Moreover, since mere traces of copper inhibited and even halted the co-polymerization of polyesters and styrene, their mixtures could not be used to impregnate brass, bronze or other copper alloys and precluded the use of copper in all equipment handling them.

The cleaning step following impregnation with polyester and styrene mixtures developed a further disadvantage in them because hazardous solvents such as acetone and other ketones were needed. The resulting solutions were extremely sticky and difficult to handle. Such cleaning of castings impregnated with the usual polyester styrene resins was a task applied to each individual casting. The solvents increased production costs even with the practice of solvent recovery. Most serious, however, was the leaching of impregnant from the pores by dissolution by the solvent. Even though all of the impregnant was not thus removed, the extent to which some was removed from the pores re-intrduced in a measure the disadvantages due to porosity that the use of impregnation was intended to avoid.

These and other limitations and disadvantages in the use of the earlier available natural as well as synthetic polymerizable impregnants are avoided by the process of the invention. According to it, the suitably cleaned and dried porous objects are treated with a liquid, organic impregnant capable of polymerizing to the solid state, while it is in the liquid state and which provides unexpected and distinctly different results from those possible with the earlier used polymerizable impregnants.

The drawing shows a flow sheet for a specific embodiment of the method of the invention.

In this invention, the porous objects are impregnated with this liquid, organic polymerizable impregnant that remains stably liquid at usual atmospheric temperatures and under the elevated pressures employed in impregnation and requires no refrigeration, between successive impregnation cycles with it, to maintain adequate fluidity for impregnation, and has a controlled viscosity, for example, within the range from about ninety-five to about three thousand centipoises, that provides it with remarkable fluidity permitting it to manifest positive and extensive pore penetration and is distinctly highly polar to metals thereby readily to wet the surface of their pores and exhibit unusually thorough and substantially complete penetration, and at the same time the excess of which outside of the pores is removable simply by flushing those surfaces with a relatively low volatile, non-inflammable liquid non-solvent for the polymerizable impregnant.

After the pores of the porous object are adequately impregnated with this impregnant, the excess of it on the surfaces outside of the pores is flushed away by the emulsification of it in a liquid inert to the impregnated object and a non-solvent for the impregnant. If the flushing liquid contained any solute, the impregnated object is then rinsed with the same liquid without any solute and thereafter treated to cure or set the polymerizable impregnant, for example, in known manner. However, as an added advantage of the invention, these impregnated objects are cured by submerging them in a liquid inert to both the impregnated object and its impregnant, and heating them in the inert liquid at a temperature and for a time sufficient to effect the setting of the impregnant to the solid state.

While any liquid, organic, polymerizable impregnant having the specific properties recited herein as effective for its inclusion in the process of the invention can be used in the impregnation step, so far there has been found to be distinctly effective as the impregnant an interpolymerizable mixture of (A) a liquid monomer having a >C=CH$_2$ group with (B) a polyester derived from the esterification of a dihydric alcohol, such as a glycol, with at least one dicarboxylic acid of which at least one is alpha,beta ethylenically unsaturated, and which mixture has cooked into its polyester component a polyglycol emulsifying agent. The impregnant composed of such a mixture is water-emulsifiable.

The liquid monomer (A) containing the reactive vinylyl group is individually normally a polymerizable compound and is exemplified by styrene, alpha-methyl styrene, para-methyl styrene, divinylbenzene, indene, vinyl acetate, methyl methacrylate, methyl acrylate, allyl acetate, diallyl phthallate, diallyl succinate, diallyl adipate, diallyl sebacate, diethylene glycol bis(allyl carbonate), triallyl phosphate, vinyl chloride, vinyl nitrile, acrylonitrile and others.

The alpha,beta ethylenically unsaturated reactant of the polyester component of the interpolymerizable mixture can be a member of a large class. Some in which the carboxyl groups are linked to one or both of the carbon atoms of the ethylenic group are, for example, maleic acid, fumaric acid, aconitic acid, mesaconic acid, citraconic acid, ethyl maleic acid, pyrocinchonic acid, xeronic acid, or itaconic acid and others. Carbic acid (i. e. endomethylene delta-4 tetrahydrophthalic acid), although not strictly an alpha,beta ethylenic-group containing acid, is nevertheless contemplated. So also are the chlorine substituted derivatives of these acids, e. g. chloromaleic. Those anhydrides that exist of these various acids are also included by the term "acid" because their resulting products with the glycols, i. e. the resulting polyesters are the same. Actually, often it is advantageous to esterify with the anhydride rather than the acid itself.

By the expression "at least one dicarboxylic acid of which at least one is alpha,beta ethylenically unsaturated" it is intended simply that the thus unsaturated acid can be replaced in part by one or more saturated dicarboxylic acids such as an aromatic dibasic acid as phthalic acid or tetrachlorophthalic acid, or an aliphatic dibasic acid such as succinic acid, adipic acid, suberic acid, azelaic acid, sebacic acid, dimethyl succinic acid, as well as chlorinated derivatives of any of them that is not so substituted. Here also the term "acid" likewise contemplates the anhydrides of these acids. In this mixture, the double bonds of the aromatic nuclei are regarded as equivalent to the aliphatic saturated bond because the aromatic double bonds do not react by addition of an atom at each of its carbons as does the ethylenic double bond. The saturated dicarboxylic acids may be included in a ratio of, say, from about one-quarter mole to ten or twelve moles per mole of the alpha,beta ethylenically unsaturated dicarboxylic acid.

The dihydric alcohol or glycol reactant of the polyester of the interpolymerizable mixture can be ethylene glycol, diethylene glycol, triethylene glycol, polyethylene glycol, 1,3-propanediol, 1,2-propylene glycol, dipropideneglycol (or di-1,3-propanediol), butylene glycol, and the like. The glycol reactant is included in a ratio to provide a slight stoichiometric excess of hydroxyl-group containing substance over the dicarboxylic acid or acids taken. This excess usually is about ten percent but conveniently can be higher or lower.

The polyglycol emulsifying agent to be cooked into the polyester component of the impregnant mixture can be a polyglycol such polyethylene glycol although polyethers of other glycols, for example, propylene glycol are also included. The polyethylene glycols are higher molecular weight polyether compounds, understood to the derived by condensation of many molecules of a glycol, such as ethylene glycol, through ether linkages to develop long chains. A source of these polyglycols is Carbide and Carbon Chemicals Company who sell them under their trademark "Carbowax." Generally, the trademark is followed by a number, for example, 1540 or 1540–W, which is understood to indicate the approximate average molecular weight of the respective "Carbowax" polyglycol.

The average molecular weight for the polyglycol emulsifying agent to be cooked into the polyester component of the interpolymerizable impregnant mixture can be from about 300 to 6000, but so far as presently indicated best results are obtained with those in the range from about 1000 to 2000. For the most part, there have been used polyglycols containing much polyether material of average molecular weight about 1500. Mixtures of such materials of different molecular weights, for example, equal quantities of molecular weights of 300 and 1500, can be used, although they are not limited to equal weights of the individual polyglycols.

The dihydric alcohol and the dicarboxylic acid or acids are esterified under the usual conditions followed in making alkyd resins, namely, in an inert atmosphere and at a temperature to expel water, such as about 150 to 200° C. The reaction usually is terminated when a reasonably low acid value, for example, between about 50 to 10, is reached.

The polyglycol emulsifying agent can be added before, during, or after the esterification reaction. It should in any event be attended with ultimate cooking of the mixture containing the polyglycol to develop compatibility with the system. Various amounts of the polyglycol can be used, for example, within the range of from about five to thirty or forty percent of the interpolymerizable components of the ssystem, that is to say the mixture of the polyester and the monomer.

The liquid monomer having the vinylyl group is added to the polyester while the latter is hot, for example, at a temperature of about 120° C. Accordingly, either or both of these components should contain a stabilizer or gelation inhibitor such as a dihydric phenol, as hydroquinone, or a substituted dihydric phenol, for example, tertiary butyl catechol, and the like, to prevent gelation while the monomer is being added as well as during any reasonable subsequent period of storage. A small amount of the inhibitor such as under one percent of the total weight of the mixture is enough, and usually about one-tenth percent of the polyester component is adequate.

The prior art shows many combinations of vinylyl group-containin monomers and polyesters of glycols with various polycarboxylic acids as suitable for the preparation of interpolymers. The herein applicable emulsifiable interpolymerizable mixtures can include various of the monomers and esterifiable glycols and dicarboxylic acids of the prior art, but with the cooked-in polyglycol to serve as the emulsifying agent. U. S. Patents 2,409,633; 2,443,741; and 2,450,552 illustrate various components that may be used with the polyglycols as proposed in this invention. Other emulsifiable interpolymerizable mixtures for use in the invention can be prepared by incorporating a polyglycol of the type, and in the manner, disclosed herein in the resin components such as are disclosed in Parker U. S. Patent 2,593,787. However, with them it is preferable to replace the quaternary ammonium salts relied on as the inhibitor as the basis of the invention of that patent by a dihydric phenol inhibitor of gelation such as hydroquinone or tertiary butyl catechol.

These various interpolymerizable mixtures can be emulsified with water, while in their uncured (or unpolymerized) state and without the use of any additional emulsifying agent other than the polyglycol already cooked into the polyester component of the interpolymerizable mixture.

It is advantageous to include in the mixture an inhibitor having at least one carboxyl group, such as an aliphatic acid used at times as a buffering acid, for example, oxalic acid, lactic acid, glycolic acid, malic acid, citric acid, and tartaric acid or a half acid ester of a hydroxy polycarboxylic acid such as the half ester of tartaric or malic acid.

The just above described inhibitors having a free carboxyl-group improve the so-called "tank life" of the interpolymerizable mixture by preventing its gelation after catalysts are added but before application of heat. These inhibitors also inhibit or retard corrosion of copper and its alloys when the interpolymerizable mixtures contact them. When heat is applied to mixtures containing these inhibitors, their action is quickly overcome and the cure then proceeds to completion in substantially normal manner.

A specific interpolymerizable mixture impregnant, which can hereafter be referred to briefly as "impregnate X" and contains the cooked-in emulsifying agent and both of the applicable inhibitors contributing to the invention herein, is prepared thus (illustrative but not restrictive); to a mixture of a mole each of maleic acid and phthalic acid and two and two-tenths moles of propylene glycol is added "Carbowax 1540" (understood to be a polyethylene glycol of molecular weight about 1540) to the extent of twenty-one percent of the total weight of the first three ingredients. The mixture is heated, in the manner already referred to, for the preparation of the polyester. Seventy-one parts by weight of the resulting polyester are then mixed while hot, at about 120° C., with 0.077 part by weight of hydroquinone and 0.2 part by weight of any one of the above described free carboxyl group containing inhibitors (for example, malic acid, oxalic acid, tartaric acid, lactic acid, or any other of them). Then while the mixture is still hot, twenty-nine parts by weight of styrene are added, thereby completing impregnant X which is allowed to cool to room temperature.

Impregnant X has all of the advantageous properties described hereinabove as shown by the impregnants used in the process of the invention. All of them polymerize solid in the pores of the porous objects treated because the styrene and other vinylyl group containing monomer, which can replace the styrene in whole or in part, co-polymerizes with the polyester.

In practicing the method of the invention, the porous objects to be impregnated, for example, brass valve bodies, are treated with suitable solvents and cleaners to remove completely any adhering dirt and grime, and heated above 250° F. to drive off any adhering rinse water. The dried valve bodies are then ready to be submerged in the liquid, unpolymerized impregnant X. The treatment preferably is carried out by placing the initially dried valve bodies in a closed container that can be evacuated to draw out substantially all of the air from the pores of the bodies. While they are still under vacuum, the unpolymerized impregnant is drawn into the container until all of the valve bodies are submerged in the liquid. The vacuum in their pores draws in impregnant and the treatment advantageously is completed by breaking the vacuum and causing the impregnant to penetrate further into the pores by applying compressed gas, such as air, pressure over its surface.

After the pressure has been on sufficiently long for the maximum practical penetration to occur, unconsumed impregnant is drawn off for use on another batch without any intermediate refrigeration. The valve bodies are removed from the container and drag-out impregnant adhering to them is flushed off by emulsification in plain water, for example, simply by playing a stream of water over all of the outer and inner exposed surfaces. No impregnant is lost from within the pores because none can be emulsified in them since no turbulence or vortex can occur in them.

The co-polymerizable impregnant mixture is then cured in known manner. It is advantageous and preferable according to the invention to cure the impregnant by immersing the impregnated valve bodies in a liquid inert both to the metal and the impregnant and at a temperature and for a time sufficient to complete the curing at that temperature. Suitable such liquids are hydrocarbons and other oils that will not dissolve the impregnant and also glycols, particularly those having low vapor pressure at the curing temperature usually above 200° F. and below the boiling point of the styrene contained in the impregnant and commonly below 290° F. and around 275° F. By curing in such a liquid and, for example, even under presure, the possibility of exudation during the curing is significantly counteracted.

The foregoing water-dispersable polyester resins are described and claimed in the co-pending application of John R. Guenther, Serial No. 318,870, filed November 5, 1952.

In addition to use in impregnating both ferrous and non-ferrous metals and alloys, the process of the invention can be used to impregnate a very wide variety of porous objects. Some illustrative examples are powder metallurgy parts, heliarc welds, nylon or other laminates, or "Bakelite" parts. Along with requiring no refrigeration to maintain the fluidity of the impregnant over extended "tank life," no aeration or agitation is needed. There is no fire hazard.

In place of water for flushing excess impregnant from the surfaces of the objects before curing, water containing an emulsifying agent such as any cooked into the polyester, or any other preferable non-ionic dispersing agent can be used. Thus, other such suitable agents can be any of the lauroyl, stearoyl or palmitoyl or other higher fatty acid, esters of the polyethylene derivative of the inner ethers of hexitols such as sorbitol and mannitol made available by the Atlas Powder Company under their trademark "Tween."

What is claimed is:

1. The method of treating a porous, rigid article having pores opening into an exposed surface to close off such pores from opening into the exposed surface, which method comprises cleaning such of the surface and the pores found not to be clean, and drying the article; immersing the article, for a time sufficient for substantial penetration of impregnant into those pores, in a liquid, organic, polymerizable impregnant that can polymerize to the solid state under appropriate curing conditions without evolution of volatiles and which, while in its liquid state, can penetrate the pores opening into the exposed surface; removing the article from immersion in the impregnant, and washing off impregnant adhering to any exposed surface of it by contacting the adhering impregnant on such surfaces with a liquid inert to the article and to the impregnant and in which the impregnant is insoluble and which forms with the impregnant an emulsion that runs off of the exposed surfaces of the article taking along the excess impregnant and leaving on the article only the washing liquid that can be removed without creating a hazard; removing such liquid and subjecting the thus impregnated article to curing conditions to polymerize to the solid state the impregnant in the pores.

2. The method of treating a porous, rigid article having pores opening into an exposed surface to close off such pores from opening into said surface, which method comprises cleaning and drying such surface and pores opening into it; immersing the article, for sufficient time for substantial penetration of impregnant into those pores, in a liquid, organic, polymerizable impregnant that polymerizes to the solid state under appropriate curing conditions and which, while liquid, can penetrate the pores opening into the exposed surface; removing the impregnated article from immersion in the impregnant; said impregnant being an interpolymerizable mixture of (A) a liquid polymerizable monomer having a $CH_2=CH<$ group with (B) a polyester resulting from the esterification of a glycol with at least one dicarboxylic acid of which at least one is alpha-alpha ethylenically unsaturated, and which polyester component of said mixture has cooked into it a polyglycol emulsifying agent; removing the article from immersion in such impregnant; washing off impregnant adhering to any exposed surface of the article by use of a washing liquid consisting essentially of water; drying the washed article and subjecting it as thus impregnated to curing conditions to polymerize to the solid state the impregnant in the pores.

3. A solid, rigid article, originally having pores opening into an exposed surface thereof, and with such pores closed off from opening into the exposed surface by having in them up to such surface a solid polymer resulting from polymerizing in them, under appropriate curing conditions, an interpolymerizable mixture of (A) a liquid polymerizable monomer having a $CH_2=CH<$ group with (B) a polyester resulting from the esterification of a glycol with at least one dicarboxylic acid of which at least one is alpha-alpha ethylenically unsaturated, and which polyester component of said mixture has cooked into it a polyglycol emulsifying agent.

4. The method of treating a porous, rigid object having pores opening into an exposed surface to close off such pores from opening into the exposed surface, which method comprises cleaning and drying such surface and the pores, immersing the rigid object in a liquid impregnant which is an interpolymerizable mixture of (A) a liquid polymerizable monomer having a $CH_2=CH<$ group with (B) a polyester resulting from the esterification of a glycol with at least one dicarboxylic acid of which at least one is alpha-alpha ethylenically unsaturated, and which polyester component of said mixture has cooked into it a polyglycol emulsifying agent, and for a time sufficient for substantial penetration of the impregnant into those pores; removing the unused body of impregnant from about the rigid object immersed into it; keeping the thus separate remaining impregnant without refrigeration at the atmospheric conditions prevailing in the area where the operations are being conducted; and thereafter using the thus kept remaining impregnant for similarly impregnating another starting porous rigid object.

5. The method as claimed in claim 2, wherein the porous, rigid article to be impregnated is a metal article which is from partly to entirely composed of copper.

6. The method as claimed in claim 5, wherein the porous article to be impregnated is a member of the class consisting of copper, brass and bronze articles.

7. The method of treating a porous, rigid article having pores opening into an exposed surface to close off such pores from opening into the exposed surface, which method comprises cleaning such of the surface and the pores found not to be clean, and drying the article; immersing the article, for a time sufficient for substantial penetration of impregnant into those pores, in a liquid, organic, polymerizable impregnant that can polymerize to the solid state under appropriate curing conditions and which, while in its liquid state, can penetrate the pores opening into the exposed surface and is inherently emulsifiable in water upon being agitated merely with water; removing the article from immersion in the impregnant, and washing off impregnant adhering to any exposed surface of it by contacting the adhering impregnant on such surfaces with a liquid inert to the article and to the impregnant and in which the impregnant is insoluble and which forms with the impregnant an emulsion that runs off of the exposed surfaces of the article taking along the excess impregnant and leaving on the article only the washing liquid that can be removed without creating a hazard; removing such liquid and subjecting the thus impregnated article to curing conditions to polymerize to the solid state the impregnant in the pores.

8. The method of treating a porous, rigid article having pores opening into an exposed surface to close off such pores from opening into the exposed surface, which method comprises cleaning such of the surface and the pores found not to be clean, and drying the article; immersing the article, for a time sufficient for substantial penetration of impregnant into those pores, in a liquid, organic, polymerizable impregnant that can polymerize to the solid state under appropriate curing conditions and which, while in its liquid state, can penetrate the pores opening into the exposed surface and is polar to metals and thereby adapted readily to penetrate deeply into the pores of the porous article; removing the article from immersion in the impregnant, and washing off impregnant adhering to any exposed surface of it by contacting the adhering impregnant on such surfaces with a liquid inert to the article and to the impregnant and in which the impregnant is insoluble and which forms with the imprgenant an emulsion that runs off of the exposed surfaces of the article taking along the excess impregnant and leaving on the article only the washing liquid that can be removed without creating a hazard; removing such liquid and subjecting the thus impregnated article to curing conditions to polymerize to the solid state the impregnant in the pores.

9. The method of treating a porous, rigid article having pores opening into an exposed surface to close off such pores from opening into the exposed surface, which method comprises cleaning such of the surface and the pores found not to be clean, and drying the article; immersing the article, for a time sufficient for substantial penetration of impregnant into those pores, in a liquid, organic, polymerizable impregnant that can polymerize to the solid state under appropriate curing conditions and which, while in its liquid state, can penetrate the pores opening into the exposed surface and is inherently emulsifiable in water upon being agitated merely with water; removing the article from immersion in the impregnant, and washing off impregnant adhering to any exposed surface of it by contacting the adhering impregnant on such surfaces with a liquid inert to the article and to the impregnant and in which the impregnant is insoluble and which forms with the impregnant an emulsion that runs off of the exposed surfaces of the article taking along the excess impregnant and leaving on the article only the washing liquid that can be removed without creating a hazard; and subjecting the thus impregnated article to curing conditions to polymerize to the solid state the impregnant in the pores.

10. The method of treating a porous, rigid article having pores opening into an exposed surface to close off such pores from opening into the exposed surface, which method comprises cleaning such of the surface and the pores found not to be clean, and drying the article; immersing the article, for a time sufficient for substantial penetration of impregnant into those pores, in a liquid, organic, polymerizable impregnant that can polymerize to the solid state under appropriate curing conditions and which, while in its liquid state, can pneetrate the pores opening into the exposed surface and is polar to metals and thereby adapted readily to penetrate deeply into the pores of the porous article; removing the article from immersion in the impregnant, and washing off impregnant adhering to any exposed surface of its by contacting the adhering impregnant on such surfaces with a liquid inert to the article and to the impregnant and in which the impregnant is insoluble and which forms with the impregnant an emulsion that runs off of the exposed surfaces of the article taking along the excess impregnant and leaving on the article only the washing liquid that can be removed without creating a hazard; and subjecting the thus impregnated article to curing conditions to polymerize to the solid state the impregnant in the pores.

References Cited in the file of this patent

UNITED STATES PATENTS

| Number | Name | Date |
|---|---|---|
| 577,283 | Coffall | Feb. 16, 1897 |
| 649,155 | Bohm | May 8, 1900 |
| 1,959,723 | Lejeune | May 22, 1934 |
| 2,140,981 | Booty | Dec. 20, 1938 |
| 2,376,706 | Lum | May 22, 1945 |
| 2,378,230 | Little | June 12, 1945 |
| 2,459,746 | Radcliffe | Jan. 18, 1949 |
| 2,486,804 | Seymour | Nov. 1, 1949 |
| 2,579,778 | Allen | Dec. 25, 1951 |